United States Patent
Ren et al.

(10) Patent No.: US 9,424,865 B2
(45) Date of Patent: Aug. 23, 2016

(54) NEAR FIELD TRANSDUCER ANNEAL FOR HEAT ASSISTED MAGNETIC RECORDING

(71) Applicant: HGST Netherlands B.V., Amsterdam (NL)

(72) Inventors: Shen Ren, Union City, CA (US); Erhard Schreck, San Jose, CA (US); Matteo Staffaroni, Pleasanton, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/533,027

(22) Filed: Nov. 4, 2014

(65) Prior Publication Data
US 2016/0125898 A1  May 5, 2016

(51) Int. Cl.
*G11B 5/31* (2006.01)
*G11B 5/00* (2006.01)

(52) U.S. Cl.
CPC ........ *G11B 5/314* (2013.01); *G11B 2005/0021* (2013.01); *G11B 2005/0024* (2013.01)

(58) Field of Classification Search
USPC ...................................................... 360/125.3
See application file for complete search history.

(56) References Cited

U.S. PATENT DOCUMENTS

| | | | |
|---|---|---|---|
| 8,427,925 B2 | 4/2013 | Zhao et al. | |
| 8,514,673 B1 * | 8/2013 | Zhao et al. | 369/13.33 |
| 8,565,049 B1 | 10/2013 | Tanner et al. | |
| 8,753,903 B1 | 6/2014 | Tanner et al. | |
| 2011/0026378 A1 * | 2/2011 | Shimazawa et al. | 369/13.33 |
| 2011/0122737 A1 * | 5/2011 | Shimazawa et al. | 369/13.24 |
| 2012/0105996 A1 * | 5/2012 | Katine et al. | 360/59 |
| 2012/0127839 A1 * | 5/2012 | Rawat et al. | 369/13.33 |
| 2013/0243947 A1 | 9/2013 | Yang et al. | |
| 2014/0050057 A1 | 2/2014 | Zou et al. | |
| 2014/0313872 A1 * | 10/2014 | Rawat | G11B 13/045 369/13.33 |

OTHER PUBLICATIONS

Bain, et al., "Near Field Optical Transducers (NFTs) for Heat Assisted Magnetic Recording (HAMR)," Available online: http://www.jamesabain-cmu.org/#!research/mainPage, last accessed online Aug. 2, 2014, 2 pages.

Bhargava et al., "HAMR Thermal Reliability via Inverse Electromagnetic Design," IEEE the Magnetic Recording Conference, Aug. 2014, 12 pages.

* cited by examiner

*Primary Examiner* — Carlos E Garcia
(74) *Attorney, Agent, or Firm* — Zilka-Kotab, PC (57) ABSTRACT

A method for annealing a metal antenna of a near field optical transducer of a magnetic write element without inadvertently heat damaging the read element. A heating element is placed within a write head build in a cerf region outside of the active area of the read and write heads. A layer of thermally conductive, electrically insulating material is formed over the heating element to separate the heating element from the antenna. The thermally conductive, electrically insulating layer is preferably in contact with the antenna. A current can be applied to the heating element to heat the antenna to a temperature that is at or above the operating temperature of the optical transducer. After annealing, the heater element can be removed by the lapping process that is used to define the media facing surface of the head.

7 Claims, 7 Drawing Sheets

NEAR FIELD TRANSDUCER ANNEAL FOR HEAT ASSISTED MAGNETIC RECORDING

FIELD OF THE INVENTION

The present invention relates to heat assisted magnetic data recording, and more particularly to a structure and process for annealing an optical near field transducer antenna without disadvantageously affecting surrounding magnetic structures.

BACKGROUND

The ever increasing need for digital data storage has driven an ever increasing demand for improved magnetic data storage systems, such as magnetic disk drive systems. The magnetic disk drive includes a rotating magnetic disk, write and read heads that are suspended by a suspension arm adjacent to a surface of the rotating magnetic disk and an actuator that swings the suspension arm to place the read and write heads over selected data tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

The increasing demand for data storage requires an ever increasing need to increase data density. The increase in data density requires ever smaller data bits, which in turn requires ever smaller read and write elements. The increase in data density also requires increasing the magnetic coercivity and anisotropy of the magnetic media in order to ensure the thermal stability of the recorded magnetic signal. These two requirements are at cross purposes, however. The smaller write head produces a smaller magnetic write field, and the increased magnetic media coercivity and anisotropy requires a higher magnetic write field to effectively record to the media.

One way to overcome this conflict and effectively record a signal at very high data density is to employ heat assisted recording, also known as "HAMR" or "TAR". In a heat assisted magnetic recording system, an optical near field transducer is used to locally heat the magnetic media just at the point of recording. This heating of the magnetic media temporarily lowers the magnetic coercivity, thereby allowing for a magnetic bit to be more easily recorded to the media with a very small magnetic recording head. The media then cools, whereby the magnetic coercivity of the magnetic media again increases making the magnetic signal thermally stable.

SUMMARY

The present invention provides a magnetic write head that includes a magnetic write pole and an optical near field transducer. A layer of thermally conductive, electrically insulating material is formed in the magnetic write head so as to contact the optical near field transducer.

This structure can be a by-product of a process for thermally annealing an antenna of an optical transducer in such a manner that a read element of the head is not damaged by heat from the annealing process. This process for annealing the antenna can include forming a read element and forming a write element over the read element. The formation of the write element can further include, forming a heating element, forming a layer of thermally conductive, electrically insulating material over the heating element and forming an optical transducer having a metal antenna over the layer of thermally conductive, electrically insulating material.

The heating element can be located entirely within a cerf region of the head build so that it is removed by lapping during the definition of the media facing surface of the head. The layer of thermally conductive, electrically insulating material, which is preferably SiC, electrically insulates the heating element from the metal antenna to prevent the electrical current of the heating element from being shunted through the antenna. However, by making this insulation layer thermally conductive, the heat from the heating element can be easily conducted to the antenna. Furthermore, this thermally conductive, electrically insulating layer can be formed to extend beyond the media facing surface plane into the active area of the sensor to thereby help to conduct annealing heat from the heating element to the antenna in the active area where it is most needed Another advantage of having the heating element located in the cerf area is that electrical leads for supplying current to the heating element, and the associated lead pads can be located entirely within the cerf region, thereby preserving space on the finished head for other lead pads and leads.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
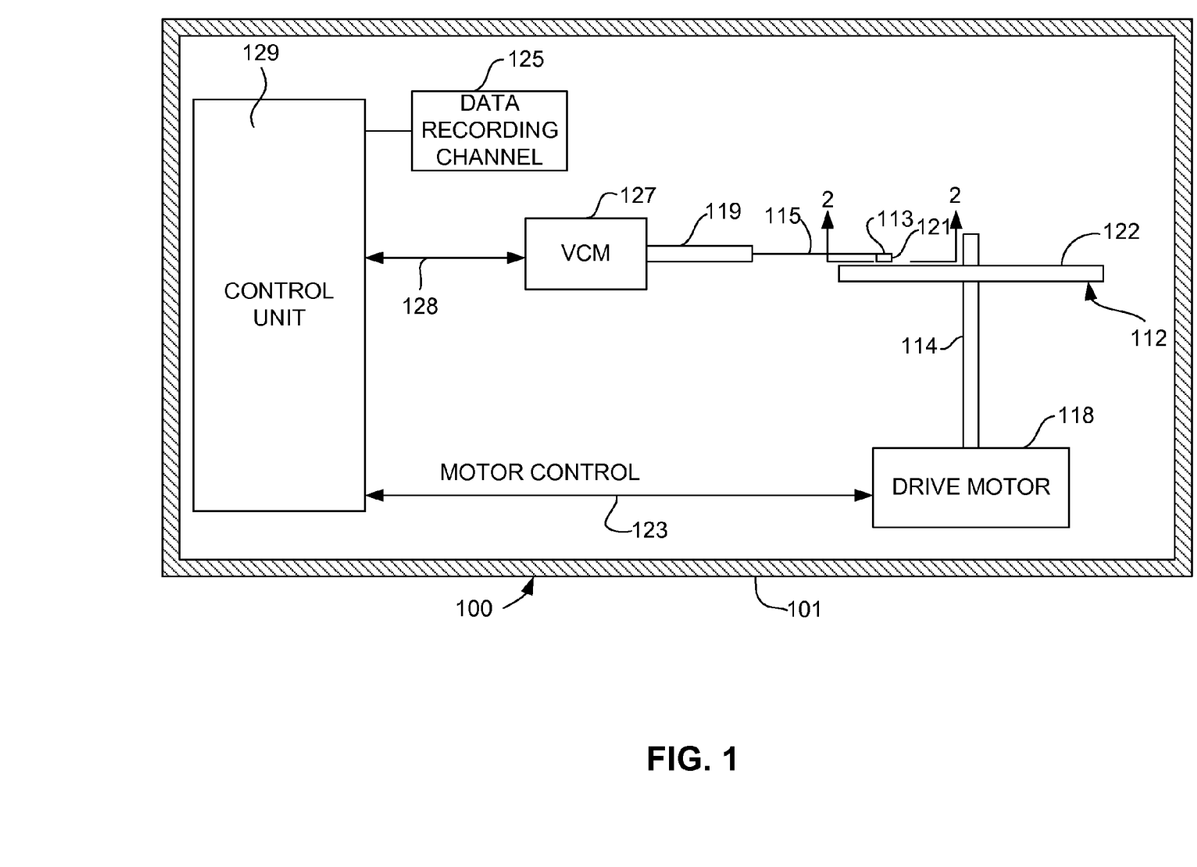
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage, means and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
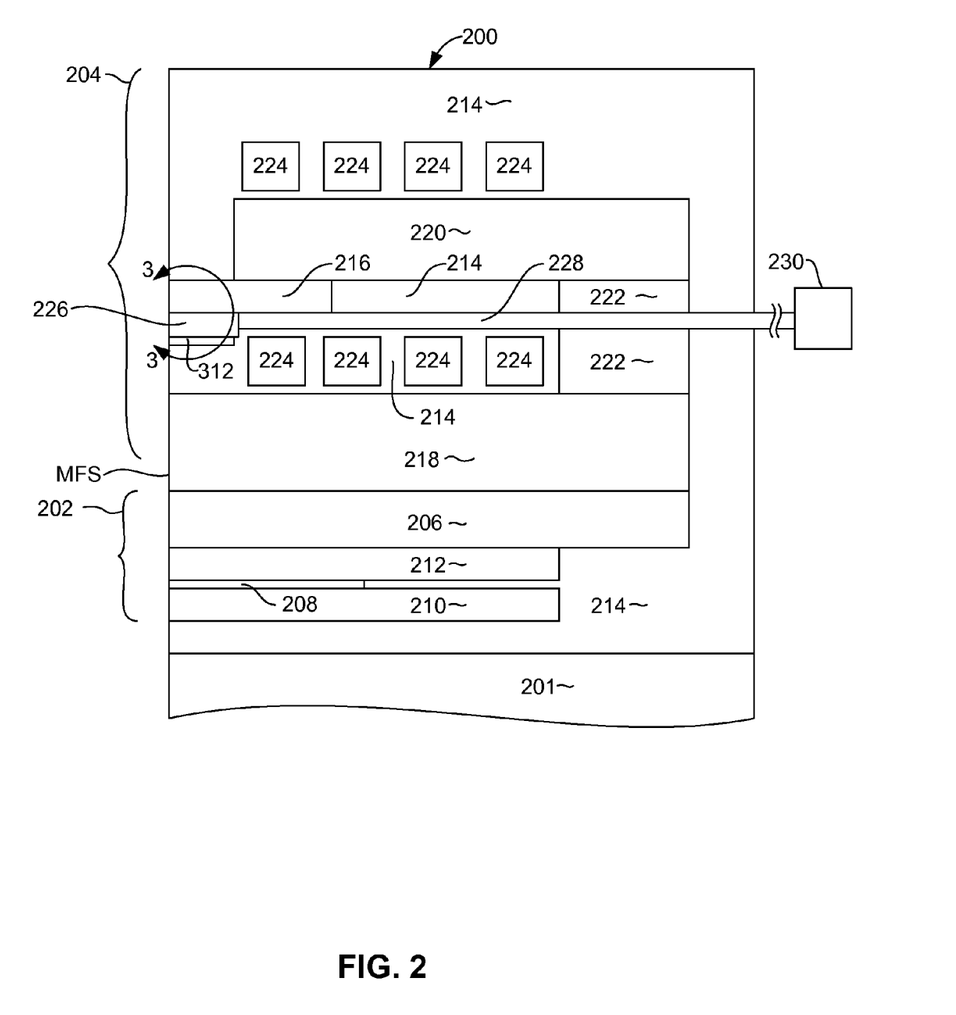
FIG. 2 is a side, cross sectional view of a magnetic read/write head.

FIG. 2 shows a side, cross sectional view of a magnetic read/write head 200 that can be formed on a trailing end of a slider. The head 200 can include a read element 202 and a write element 204, both of which can be formed on a slider body 201. The read and write elements 202, 204 can be separated from one another by an insulation layer 206. The read element 202 can include a magnetoresistive sensor 208, such as a giant magnetoresistive sensor (GMR) or tunnel junction sensor (TMR). The sensor 208 can be sandwiched between first and second magnetic shields 210, 212 and an insulation layer such as alumina 214 can fill the space behind the sensor 208 and shield 210, 212.

The write head 204 can include a magnetic write pole 216 that extends to a media facing surface (MFS) and a magnetic return pole 218 that also extends to the media facing surface (MFS). The write head 204 can also include a trailing magnetic return pole 220 and magnetic back gap structure 222 that is located away from the media facing surface MFS. The trailing return pole 220 and magnetic back gap 222 magnetically connect the write pole 216 with the magnetic return pole 218 to form a magnetic yoke. A write coil structure 224 (shown in cross section in FIG. 2) is formed to pass near the write pole 216, and as shown in FIG. 2 the write coil 224 can pass above and below the write pole 216. The write coil 224 can be embedded in a non-magnetic, dielectric insulation layer 214 such as alumina.

When an electrical current flows through the write coil 224, a resulting magnetic field causes a magnetic flux to flow through the write pole 216, trailing return pole 220, back gap 222 and return pole 218. This results in a magnetic write field being emitted from the tip of the write pole 216 toward and adjacent magnetic media (not shown in FIG. 2). This write field locally magnetizes the magnetic media thereby recording a data bit onto the media.

The need for increased data density in magnetic data recording systems requires the recording of ever smaller data bits. This in turn requires that the write pole 216 have a smaller cross section at the media facing surface MFS. However, smaller data bits are inherently less magnetically stable. In order to ensure that the recorded bits are magnetically stable, the magnetic media must have an increased magnetic coercivity and increased magnetic anisotropy. This, however, also makes it harder to record the magnetic bit. This problem is exacerbated by the reduced size of the write pole 216, which decreases the amount of magnetic write field that the write head can produce. One way to overcome this challenge is through the use of thermally assisted magnetic recording. In a thermally assisted magnetic recording system, the magnetic media is temporarily, locally, heated at a location near or at the location where the magnetic bit is to be recorded. This heating temporarily lowers the magnetic coercivity and magnetic anisotropy of the media, thereby allowing a magnetic bit to be recorded with a smaller write field. The media then cools, once again raising the coercivity and anisotropy and ensuring that the recorded magnetic bit is magnetically stable.

With reference still to FIG. 2, the magnetic head 200 is configured to provide such thermally assisted magnetic recording. The head 200 includes a near-field optical transducer 226 and an optical waveguide 228 that extends through the head 200. The optical waveguide 228 is coupled to a laser diode 230 that can be located at a back side of the slider or at some other suitable location. The waveguide 228 and near field optical transducer 226 focus light from the laser diode 230 through the magnetic head 200 to a location near the write pole 216 at the media facing surface MFS.

Figure 3:
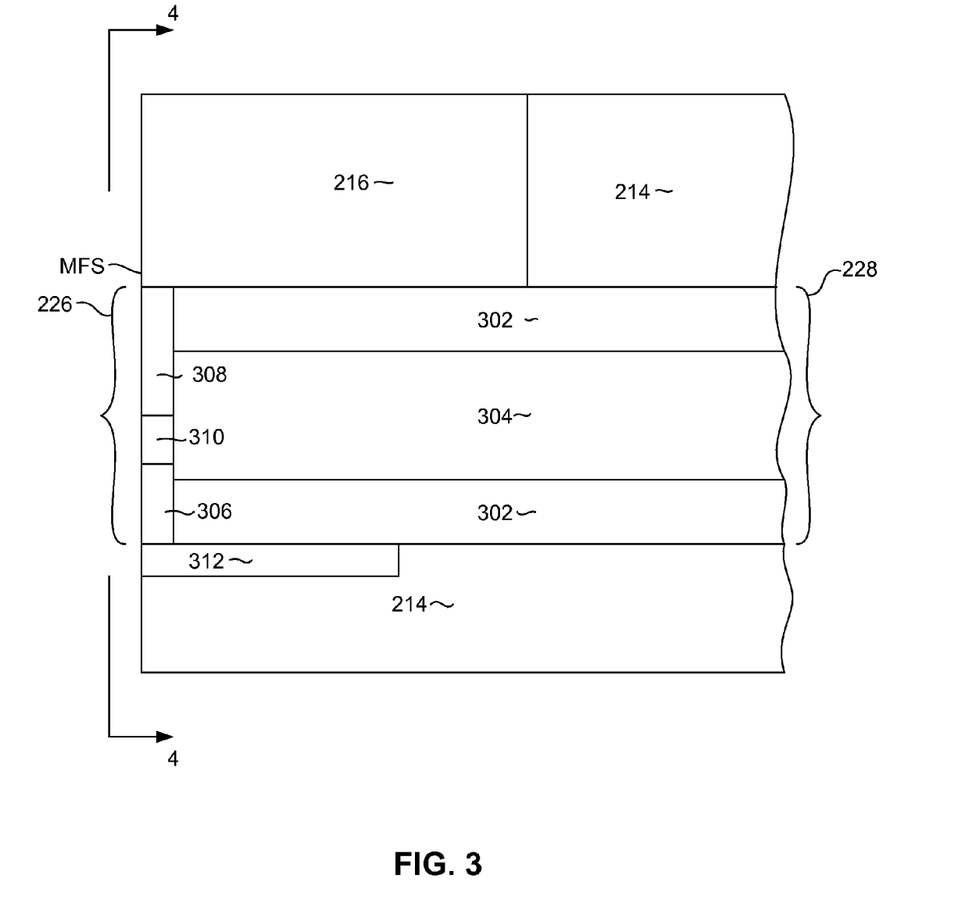
FIG. 3 is an enlarged view of a portion of the magnetic read/write head as taken from circle designated 3 in FIG. 4.
Figure 4:
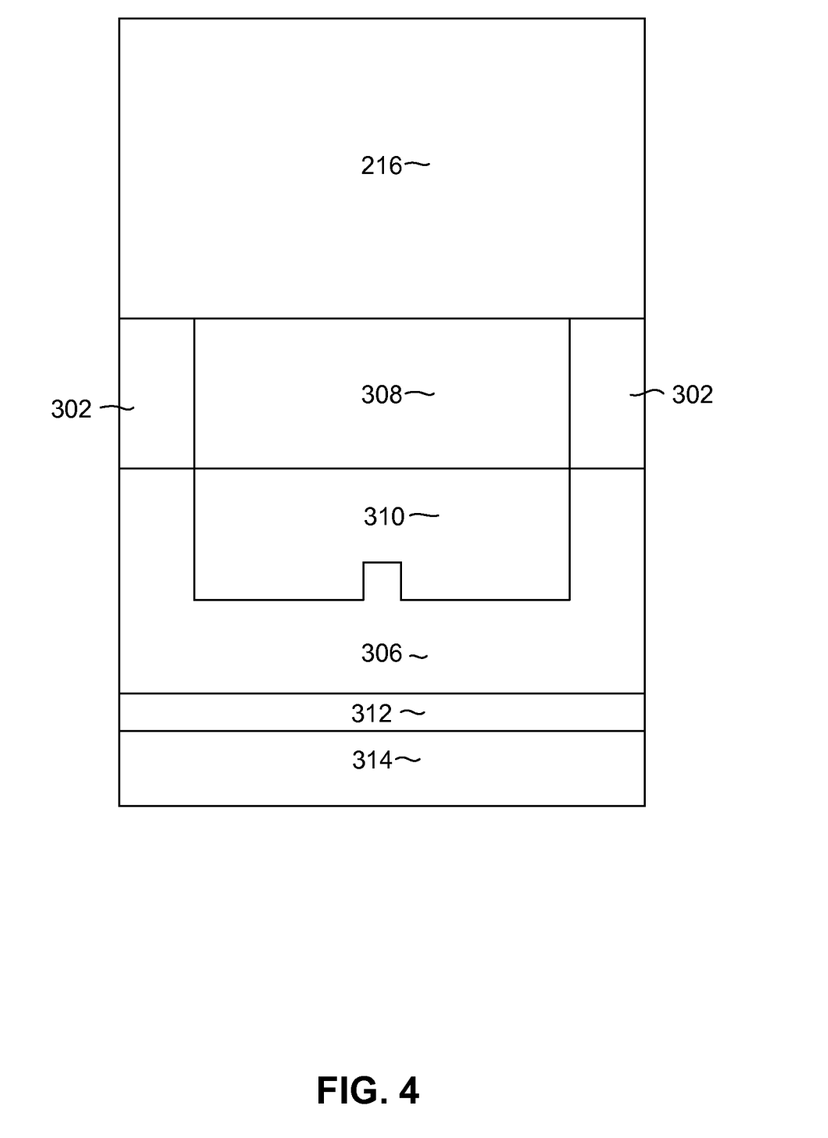
FIG. 4 is an enlarged view as seen from line 4-4 of FIG. 3 showing a view of a near field, optical transducer as viewed from the media facing surface.

The configuration of the near field optical transducer 226 and optical waveguide 228 can be understood more clearly with reference to FIGS. 3 and 4. FIG. 3 is an enlarged view taken from the circle 3 of FIG. 2, and FIG. 4 is a view of the media facing surface MFS as seen from line 4-4 of FIG. 3. As shown in FIG. 3, the wave guide 228 includes a cladding material 302, which surrounds or partially surrounds an inner, transparent waveguide material 304. The waveguide material 304 can be an oxide such as tantalum oxide $Ta_2O_5$, titanium oxide ($TiO_2$), niobium oxide ($Nb_2O_5$), zirconium oxide ($ZrO_2$), lanthanum oxide ($La_2O_3$), Yittrium oxide ($Y_2O_3$), scandium oxide ($Sc_2O_3$), or a binary, ternary or quanternary combination of these oxides. The wave guide material 304 can also be constructed of oxynitrides such as silicon oxynitride ($SiO_xN_y$), tantalum oxynitride ($TaO_xN_y$), titanium oxynitride ($TiO_xN_y$) and zirconium oxynitride ($ZrO_xN_y$). The cladding material 302 can be constructed of an electrically insulating material such as an oxide such as alumina or some other suitable material.

The near field transducer 226 also includes an opaque metal antenna 306 and a magnetic lip 308, both of which are formed at the media facing surface MFS. The antenna 306 is preferably constructed of Au or an Au alloy, and the magnetic lip 308 extends from the write pole 216 toward an aperture 310 that is formed between the magnetic lip 308 and the antenna 306.

The configuration of the of the antenna 306 and magnetic lip 308 can be seen more clearly with reference to FIG. 4, which shows a view of the media facing surface (MFS) as seen from line 4-4 of FIG. 3. As can be seen, the antenna 306 can have a shape that generally resembles a letter "E" that has been rotated 90 degrees counterclockwise. That is, the antenna has sides that extend upward toward the magnetic lip 308 and as an opening (e.g. the aperture 310) with a bottom of the opening being formed with an upward extending notch. This configuration has been found to provide good performance characteristics. However, the antenna 306 can have some other shape, such as, but not limited to a horseshoe or rorated "C" shape, or some other shape that provides an aperture 310.

In FIGS. 3 and 4, it can also be seen that the near field transducer 226 may also include a thin layer of thermally conductive, electrically insulating material 312. This layer 312, is optional and is a remnant of a structure and process for facilitating the annealing of the antenna 306, which will be described in greater detail herein below. While the layer 312 can be constructed of various materials, it is preferably constructed of silicon carbide SiC.

The preferred material for the antenna 306 is gold, Au, or a gold alloy. Unfortunately, gold is a highly mobile material even at modest temperature increases, such as would be expected in heat assisted magnetic recording in which temperatures of around 200 degrees C. are typically experienced. However, if the antenna 306 is pre-annealed at a temperature that is the same as or higher than the operating temperature of the near field optical transducer 226, the material of the antenna 306 will become much more stable under actual product operating conditions. During this pre-anneal, the material can rearrange itself to the most stable state before it is later processed into its final shape (e.g. by lapping).

However, various available annealing techniques come with challenges and drawbacks. For example, one way to anneal the antenna would be to perform a full wafer anneal after the read and write heads have been completely formed on a wafer. This however would negatively impact the read sensor, such as by undoing the previously performed anneal that was used for setting the magnetic direction of the magnetic pinned layer. As those skilled in the art will appreciate, a magnetic sensor typically includes a magnetic free layer and a magnetic pinned layer. The magnetization of the pinned layer is typically set by applying a strong magnetic field while the read sensor is heated to a temperature that is above the blocking temperature (Curie temperature) of the pinning layer. By heating the entire wafer to a temperature high enough to anneal the antenna 306 this previously performed pinned layer anneal can be "undone" causing the pinned layer to lose its necessary pinned magnetic orientation.

Another possible method for annealing the antenna 306 would be to focus a laser at the antenna. However such a process would be very difficult in practice due to the very small size of the head elements and even smaller size of the near field optical transducer 226. It would be very difficult to align the laser with the antenna with sufficient accuracy to ensure that the laser is not also directed at the sensor (which would again affect the previous sensor anneal). In addition, such a laser annealing approach would result in changes in the surface properties which can change the absorption behavior and change the heat supplied to the antenna 306. As a result, the laser anneal does not allow for an accurate and reliable feedback mechanism for monitoring and controlling the annealing process.

In order to overcome these challenges, a process can be implemented wherein a heater element can be formed in a cerf region of the wafer so that the heater element can be activated at the wafer level in the manufacturing process and the heater element can then be removed during lapping when the wafer is sliced into rows and then lapped to define the media facing surface. Such a process can be better understood with reference to FIGS. 5-7.

Figure 5:
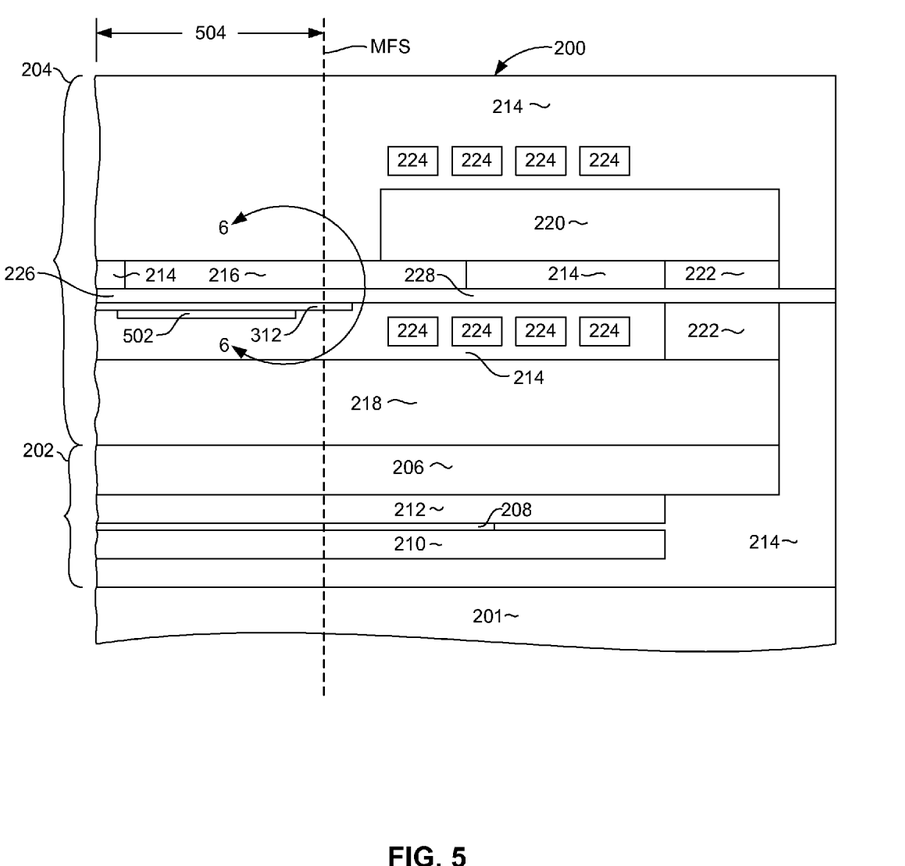
FIG. 5 is a side cross sectional view of a magnetic read/write head in an intermediate stage of manufacture, prior to a slicing and lapping operation, illustrating a structure for annealing a near field transducer antenna.
Figure 6:
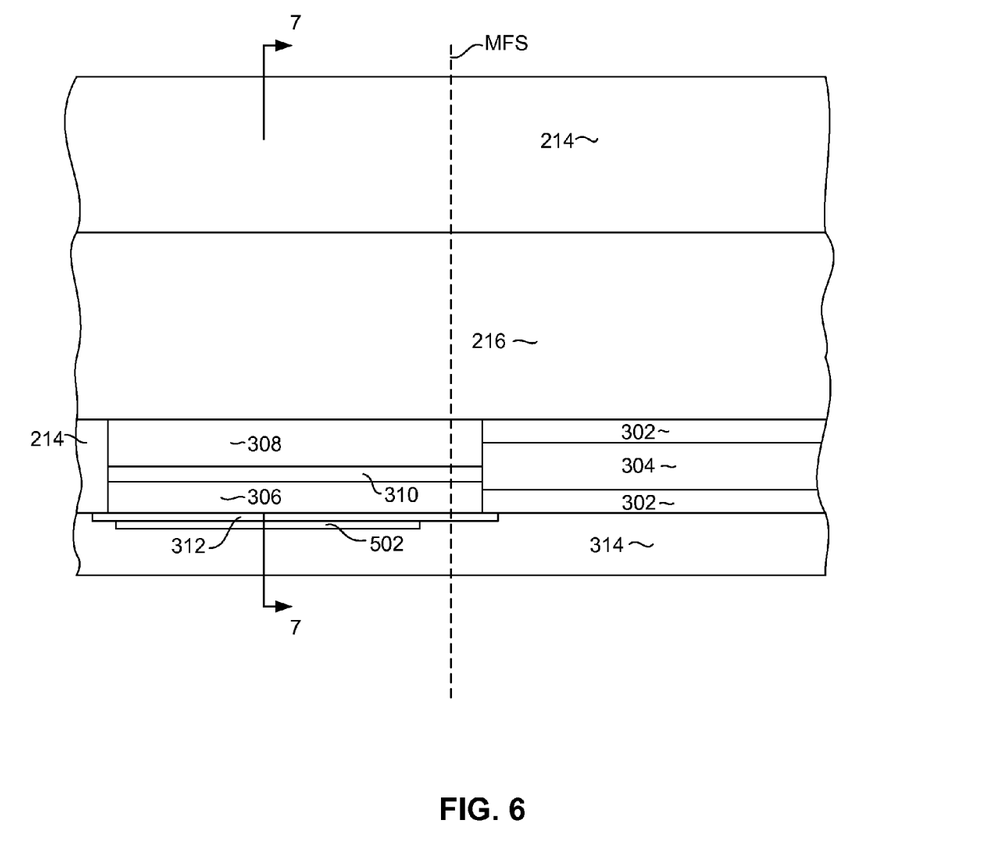
FIG. 6 is an enlarged view as seen from the circle designated 6 in FIG. 5.

FIG. 5 shows side cross sectional view of a magnetic head structure formed on a wafer before lapping has been performed to define the media facing surface. The location of the media facing surface plane is indicated by the dashed line denoted as MFS. FIG. 6 shows an enlarged view of the area indicated by circle 6-6 of FIG. 5. In FIG. 5 it can be seen that a heating element 502 is located in a region that is entirely beyond the media facing surface plane MFS. This region can be referred to as the "cerf" region 504, because this portion of the wafer will be entirely removed by the slicing and lapping operations that cut the wafer into individual slider rows and wherein this cerf region 504 is removed by lapping until the MFS plane has been reached. It also can be seen that the heater element 502 is separated from the near field optical transducer 226 by the thermally conductive, electrically insulating layer 312, a majority of which can be located in the cerf region 504. However, whereas the heater element 502 is located entirely within the cerf region 504, the thermally conductive, electrically insulating layer 312 can (and preferably does) extend beyond the media facing surface plane MFS (i.e. beyond the cerf region) into the active region that will become the finished head 200.

Figure 7:
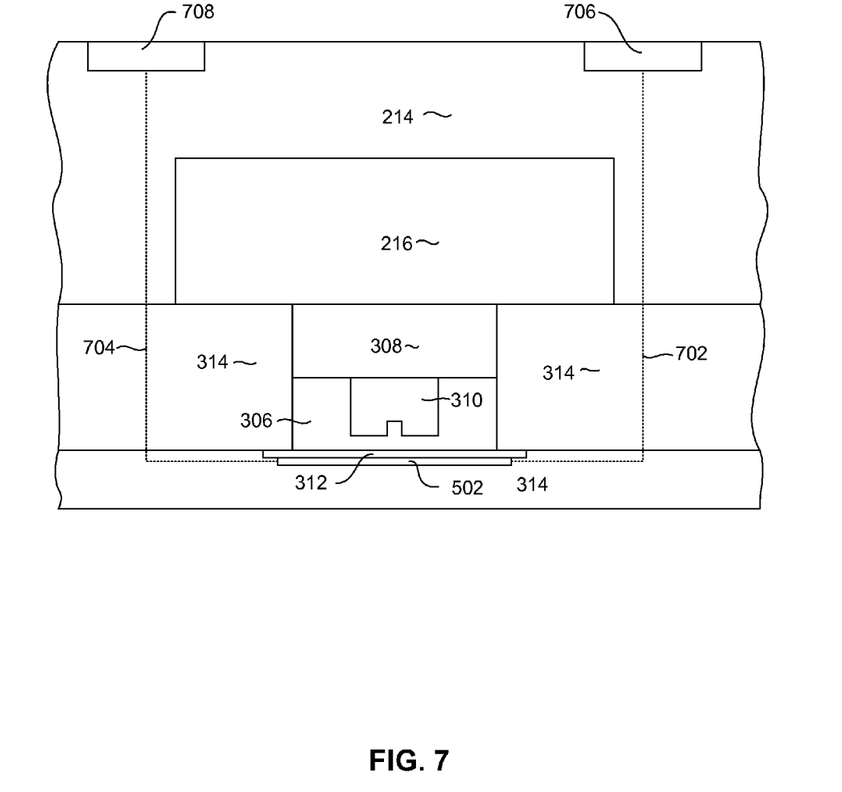
FIG. 7 is a sectional view as seen from line 7-7 of FIG. 6.

The locations of the heater 502 and layer 312 relative to the near field optical transducer 214 can be seen more clearly with reference to FIGS. 6 and 7. FIG. 6 is an enlarged view of the area indicated by circle 6-6 of FIG. 5, and FIG. 7 is a cross sectional view of a plane that is parallel with the media facing surface MFS as seen from line 7-7 of FIG. 6. As shown in FIGS. 6 and 7, the thermally conductive, electrically insulating layer 312 is in contact with the antenna 306. The heating element 502 is preferably in direct contact with the thermally conductive, electrically insulating layer 312.

The heater element 502 is a layer of electrically conductive material that preferably has a sufficiently high electrical resistance that when an electrical current is supplied to the heating element 502 it heats up as a result of Joule heating. However, the antenna 306 (which as discussed above is gold or a gold alloy) is highly electrically conductive. Therefore, if the heating element 502 were to be placed in direct contact with the antenna, any current applied to the heating element would just be shunted through the antenna 306 and no heating would be achieved. Therefore, the presence of the electrically insulating layer 312 between the heating element 502 and the antenna 310 prevents this, allowing the heating element 323 to heat up as described. However, it is also necessary that the heat from the heating element 312 be readily conducted to the antenna 306 for effective annealing of the antenna. Typically used electrical insulators such as alumina ($Al_2O_3$) have too high a thermal resistance to allow the heat from the heater 502 to conduct to the antenna 306. Therefore, it is desirable that the layer 312 be a material that is both electrically insulating and thermally conductive, having a higher thermal conductivity than alumina. To this end, the layer 312 is preferably constructed of silicon carbide (SiC) or alternatively of a material having a thermal conductivity that is at least as great as that of SiC.

As can be seen in FIG. 6, the heater element 502 is located in the cerf area 504, and primarily heats the antenna 306 in this area. However, as will be appreciated it is the portion of the antenna 306 to the right of the media facing surface plane MFS (i.e. the portion that will remain in the finished head, rather than in the cerf) where the annealing is actually needed most. Because gold is a good thermal conductor, the heat applied in the cerf region 504 will conduct to the active region to the right of the MFS plane. However, in order to further facilitate this thermal conduction, the thermally conductive layer 312 can be formed so that it extends beyond the MFS plane into the active region. Because the layer 312 is electrically insulating and can be constructed of a physically hard material such as SiC, this layer can remain in the finished head with no adverse consequences.

Yet another advantage can be understood with reference to FIG. 7, which is a cross sectional view of a plane parallel with the media facing surface plane in the cerf region as seen from line 7-7 of FIG. 6. In order to activate the heating element 502, electrical current can be supplied to the heating element 502 by electrical leads 702, 704, which are shown in dotted line in FIG. 7. These leads can then connect the heating element 502 with contact pads 706, 708 which can be formed on the trailing edge surface of the head. As those skilled in the art will appreciate, in a finished slider and magnetic head, various contact pads are formed on the trailing edge surface of the head in order to provide electrical connection with various components, such as the read element, write element as well as various other structures. As a consequence, space for forming such contact pads is scarce, and it would be undesirable to add further contact pad space demands on the finished magnetic head. However, as understood with reference to both FIGS. 6 and 7, it can be seen that the contact pads 706, 708 can actually be located in the cerf region. These contact pads can be used at wafer level (before lapping) to anneal the antenna 306 by heating the antenna 306 to a temperature that is at least as high as an operating temperature of the near field optical transducer 226 in the finished product. However, after the wafer has been sliced into rows and after the lapping has been performed, the pads 706, 708, leads 702, 704 and heating element 502 will all be removed, and will not remain in the finished head. Therefore, the use of the heater can be implemented without occupying valuable contact pad "real estate" on the finished slider and head.

While various embodiments have been described above, it should be understood that they have been presented by way of example only and not limitation. Other embodiments falling within the scope of the invention may also become apparent to those skilled in the art. For example, while the annealing process and structure have been described in terms of a head for use in a disk drive system, this could also be applied to a magnetic tape drive system. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic recording head, comprising:
   a write element including a magnetic write pole and a near field optical transducer having a metal antenna located at a media facing surface and having a leading edge surface at a side opposite the write pole; and
   a layer of thermally conductive, electrically insulating material having a thermal conductivity greater than that of alumina contacting the leading edge surface of the metal antenna.

2. The magnetic recording head as in claim 1, wherein the thermally conductive, electrically insulating material comprises SiC.

3. The magnetic recording head as in claim 1, the magnetic recording head further comprising a waveguide material that is at least partially surrounded by a cladding material connected with the near field optical transducer, and wherein the layer of thermally conductive, electrically insulating material is in contact with a portion of the cladding material.

4. The magnetic recording head as in claim 1, wherein the metal antenna comprises Au.

5. The magnetic recording head as in claim 1, wherein the metal antenna comprises an Au alloy.

6. The magnetic recording head as in claim 1 wherein the layer of thermally conductive, electrically insulating material has a thermal conductivity at least as great as that of SiC.

7. A magnetic data recording system, comprising:
   a housing;
   a magnetic media mounted within the housing;
   a magnetic recording head formed within the housing, the magnetic recording head being connected with an actuator for moving the magnetic recording head relative to a surface of the magnetic media; and wherein the magnetic recording head further comprises;
   a read element; and
   a write element including a magnetic write pole and a near field optical transducer having a metal antenna located at a media facing surface and having a leading edge surface at a side opposite the write pole; and
   a layer of thermally conductive, electrically insulating material having a thermal conductivity greater than alumina contacting the leading edge surface of the metal antenna.

\* \* \* \* \*